United States Patent
Sunshine

[11] Patent Number: 5,829,343
[45] Date of Patent: Nov. 3, 1998

[54] ADJUSTABLE BAKING BAND

[76] Inventor: Gladys Sunshine, Box 282, 128 Columbia Dr., Hurleyville, N.Y. 12747

[21] Appl. No.: 838,793

[22] Filed: Apr. 10, 1997

[51] Int. Cl.6 .............................. B65D 25/20; A47J 27/00
[52] U.S. Cl. ........................ 99/432; 99/447; 99/DIG. 15; 220/400; 220/912; 126/390; 426/505; 426/523
[58] Field of Search .............................. 99/426, 432, 439, 99/428, 440, 447, DIG. 15; 220/400, 402, 403, 912; 126/390; 426/496, 505, 523

[56] References Cited

U.S. PATENT DOCUMENTS

| | | | |
|---|---|---|---|
| 1,974,186 | 9/1934 | Kollman | 126/390 |
| 2,288,795 | 7/1942 | Earl | 99/DIG. 15 X |
| 3,431,836 | 3/1969 | Murrell | 99/DIG. 15 X |
| 3,612,036 | 10/1971 | Kaufman | 126/390 |
| 3,946,893 | 3/1976 | Bowersmith . | |
| 4,197,832 | 4/1980 | Thomas et al. | 126/390 |
| 5,004,121 | 4/1991 | Howe | 220/458 |
| 5,609,265 | 3/1997 | Haberkorn et al. | 220/400 X |

OTHER PUBLICATIONS

Decorating Cakes and Party Foods; Louise Spencer 1969.

*Primary Examiner*—Reginald L. Alexander
*Attorney, Agent, or Firm*—Sandra M. Kotin

[57] ABSTRACT

A band of terry cloth folded longitudinally and having at least one strip of loop-type fastener affixed to the band on the outer surface of one end and at least one tab of hook-type fastener affixed to the inner surface of the band at the other end. The method of saturating the band with water, securing it about the outer side walls of a baking pan containing a batter and baking the batter, the resulting cake having a level top surface, minimal side shrinkage and an even texture.

5 Claims, 1 Drawing Sheet

ADJUSTABLE BAKING BAND

FIELD OF THE INVENTION

The instant invention relates a baking band which assists in maintaining an even baking temperature throughout a baked good resulting in a product with a level top surface, minimal side shrinkage and an even texture, and the method of use of the baking band.

BACKGROUND OF THE INVENTION

Obtaining baked goods with an even top surface and one without cracks has long been the goal of commercial bakers and homemakers. There have been many attempts to solve this problem by designing various insulated baking pans.

Kollman (U.S. Pat. Nos. 1,764,685 and 1,974,186) teaches the use of an asbestos strip around the outside of the baking pan with a metal shield covering the strip. Kaufman used heat absorbing straps around the outside of the pan and used insulating inserts at specific areas in the pan. (U.S. Pat. No. 3,612,036).

Bowersmith (U.S. Pat. No. 3,946,893) designed a double pan arrangement with an insulating layer of water between the pans at the sides only. Howe (U.S. Pat. No. 5,004,121) developed a non-metallic baking pan with specific areas constructed thicker than other areas.

All of the above-noted devices are special pans and do not help the baker who already has his or her own pans and would like to improve the quality of the baked goods. Louise Spencer described the use of strips of terry cloth that could be soaked with water and pinned to the sides of a conventional baking pan "to get cakes that don't hump in the middle". (Decorating Cakes and Party Foods Baking Too!, Hearthside Press, Incorporated, New York, N.Y. 1969 pp. 28,29). Thomas et al. (U.S. Pat. No. 4,197,832) teaches the use of a wetted elastic ring of material placed around the outside of the baking pan to achieve the same result.

The fabric band that does not fit tightly and securely about the circumference of the pan will slip down during baking or often while putting the pan into the oven. It is difficult to maintain a wet fabric band in good contact about the outside of a baking pan using pins to hold the band in place. One must usually insert one finger in back of the fabric one is pinning. This requires pulling the fabric away from the pan surface leaving a loose fitting band. Any fabric with elasticity will lose that quality after time and become ineffective. An elastic fabric is heavier when saturated with water and this added weight can pull the fabric down and away from the pan early in the baking period. A band sized to fit one pan cannot be used on baking pans of different sizes.

There is a need for a baking band made of a non-elastic material that will hold enough water to remain wet during the normal baking period, but that will remain tightly affixed about the outside of the conventional baking pan to be effective throughout that period and to produce a baked product with an even texture, flat top and without a cracked surface. There is a need for an adjustable baking band that can securely fit baking pans of various circumferences, depths and shapes.

BRIEF SUMMARY OF THE INVENTION

The present invention provides a band of material that can hold sufficient water to remain wet during normal cake baking periods and will cling tightly to and make good contact with the outside of the baking pan during the entire baking period.

It is an object of the present invention to provide a band of water absorbant fabric that is completely adjustable so as to fit tightly around a baking pan and remain in place throughout the full baking period.

It is another object of the present invention to have a single band that will fit tightly about baking pans of varying circumferences and shapes with good contact about the entire outer surfaces of the baking pans.

It is a further object of the present invention to have a band that functions well with deep baking pans, is easy to fasten, and clings to the entire exterior surface thereof.

Another object of the present invention is to provide a band the can be used with baking pans having non-parallel side walls, still maintaining a tight fit and good contact thereabout.

A still further object of the present invention is to provide a band that is reusable and that will withstand repeated heating with no deterioration or loss of function and is simple and inexpensive to manufacture.

Other features and advantages of the invention will be seen from the following description and drawings.

DETAILED DESCRIPTION OF THE INVENTION

Figure 4:
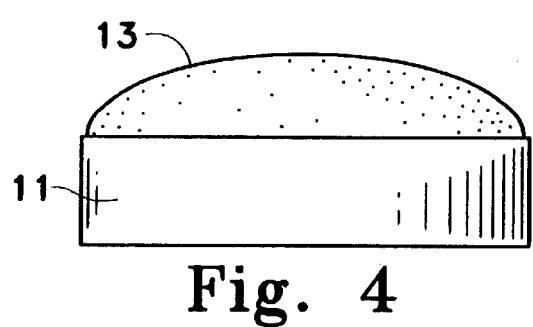
FIG. 4 is a side eleveation of a baking pan without the baking band and with a baked cake.

Most baked goods have a tendency to rise to a greater degree in the center then at the edges. When square or rectangular baking pans are used, the corners of the baked good are often dry and overbaked. This has been attributed to uneven heating where the batter adjacent the side walls is heated faster and becomes firm early in the baking period. The batter at the center of the pan remains soft and expands to a greater degree, rising higher in the center resulting in a domed finished cake as seen in FIG. 4. Often the top of the cake will also crack due to uneven expansion. When using two or more layers, the domed part 13 of the cake top must be cut away to provide a flat surface on which to place the next layer. This is wasteful and often produces a slanted surface and excessive crumbling if the cake is not cut properly.

Insulating the outer side walls of the baking pan prevents the side walls and the batter adjacent to the side walls from heating faster than the batter at the center of the pan. The entire batter is heated uniformly resulting in a cake exhibiting less side shrinkage, a level top surface 12 and an even texture. Using the baking band and method of the instant invention accomplishes this and the result can be seen in FIG. 3 in contrast to a similar cake baked without the baking band seen in FIG. 4.

The baking band 10 of the present invention is made of cotton terry cloth that is folded over lengthwise at least once, to provide double thickness. Terry cloth will hold more water than most other fabrics when saturated and therefore will remain wet throughout the entire cake baking period. Another advantage of cotton terry cloth is the fact that it is not an elastic fabric and therefore retains its integrity through repeated use and will not deteriorate, melt or become singed from such use under normal cake baking temperatures.

Prior use of pins to hold the baking band in place has not proven reliable and the bands tend to slip down even before the pan is placed in the oven. Closures such as snaps are not effective unless a band is sized for one specific pan. Snaps placed at incremental locations will not necessarily be correctly positioned when using a band for more than one pan size. Any fastening means for such a band must be adjustable, but in a continuous fashion, not in increments, because a tight fit is essential, both to prevent slipping and to insure good contact with the entire exterior surface of the baking pan.

Figure 1:
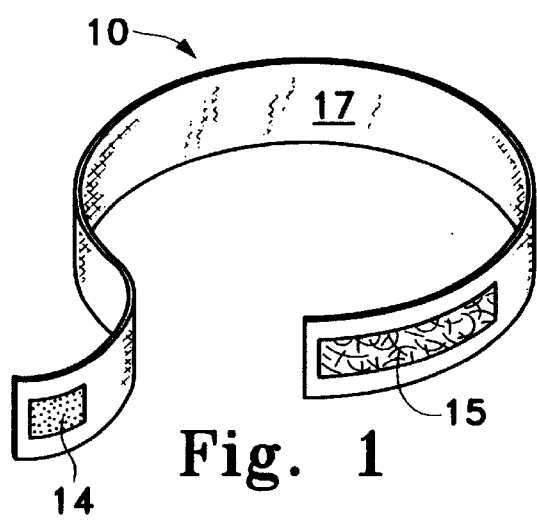
FIG. 1 is a perspective view of one embodiment of the baking band of the present invention.
Figure 3:
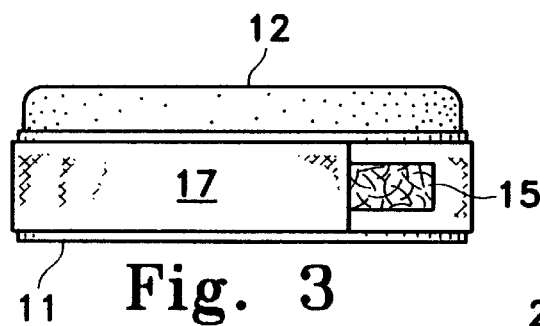
FIG. 3 is a side elevation of a baking pan with the baking band in place and with a baked cake.
Figure 7:
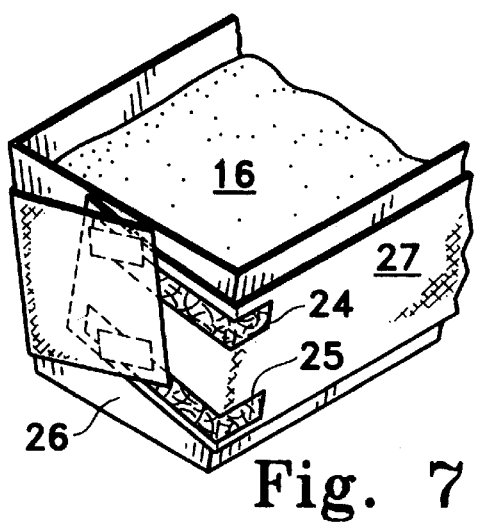
FIG. 7 is a partial perspective view of a deep baking pan having slanted side walls, containing batter and with the second embodiment securely in place.

The ideal closure means is the use of hook- and loop- type fastening strips. By affixing a long strip of loop- type fastener 15 on the outside surface of one end of the terry-cloth band 17 and a rectangle of hook- type fastener 14 on the inner surface of the other end of the band (see FIG. 1), a single band can be used with baking pans of varying circumferences and shapes. The use of the long strip on the outside surface and the shorter strip or rectangle on the inside surface insures good overlap as seen in FIGS. 3 and 7 and there is no loose overhanging end to dry out and become singed or catch fire, and no loose end dragging under the pan. The end with the hook-type fastener overlaps the loop- type fastener strip at any point along its length where the two fastener pieces come in contact with each other and they are held fast until manually removed. The same band can be fastened just as securely to round or rectangular baking pans.

The regular hook- and loop- type fastening strips sold in fabric and notions stores and manufactured by Velcro USA Inc. of Manchester, N.H. work very well. These strips were tested by stitching them to a double thickness cotton terry cloth band, saturating the band with water, and fastening it around a baking pan filled with water and placed in an oven maintained at 500° F. for 1 hour 40 minutes. The hook- and loop- type fastening strips could be reused repeatedly with no loss of function. Velcro USA Inc. also manufactures MID-TEMP® fasteners good for dry heat conditions to 450° F. and so will perform well with the wetted band if the use of such fasteners is deemed necessary. Baking bands using these products for closure have no metal parts and can be used as safely in microwave ovens as in conventional ovens should this be desired. The baking band should always be allowed to cool completely after use before being used again.

Figure 2:
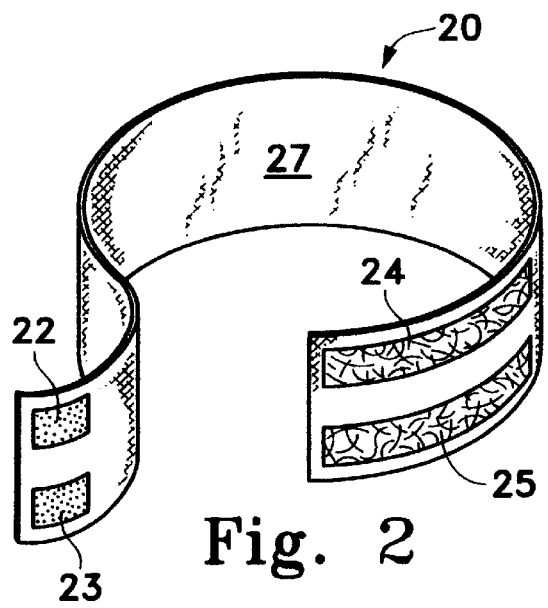
FIG. 2 is a perspective view of a second embodiment of the baking band of the present invention.
Figure 6:
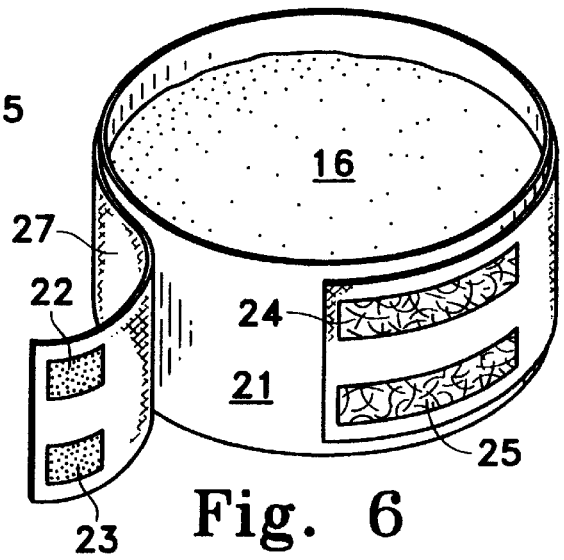
FIG. 6 is a perspective view of a deep baking pan containing batter and with the second embodiment of the baking band being applied.

Baking pans come in a variety of sizes, depths and shapes. To be most effective, the width of the baking band should be substantially the depth of the baking pan on which it is to be used and should certainly be above the level of the batter 16 in the pan. The length of the baking band must be greater than the circumference of the baking pan and long enough so the fastening strips overlap for secure closure. Shallow pans, or layer pans 11 can be insulated easily using the baking band 10 as described above. When a deeper baking pan 21 is used, the second embodiment 20 of the instant invention, the wide baking band is desirable. (See FIG. 2) A better result is obtained with the wide baking band using two sets of hook- and loop- type fasteners. Two strips of loop-type fastener are affixed along the length of the outer surface of one end of the wide baking band 27, one 24 near the top edge of the band and the other 25 near the bottom edge of the band. Two rectangles of hook- type fastener are affixed to the inner surface of the other end of the wide baking band 27, one 22 near the top edge of the band and the other 23 near the bottom edge of the band. (See FIGS. 2, 6 and 7) Using the two sets of fasteners provides more flexibility in placing the wet band and tighter contact about the side walls of the deeper baking pan 21. The two sets of fasteners are particularly effective with deeper baking pans having slanted side walls, such as the traditional loaf pan 26. The ends of the baking band can overlap at an angle, still maintaining proper closure and good contact between the band and the outer surfaces of the side walls all around the pan as seen in FIG. 7.

Figure 5:
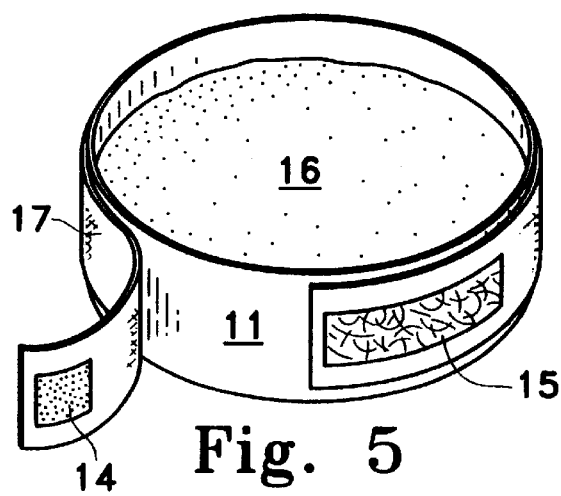
FIG. 5 is a perspective view of a baking pan containing batter and with the baking band being applied.

The baking pan should be greased or otherwise prepared as the recipe directs and filled to the proper depth with the batter 16. To use the baking band, it should be saturated with water but no longer dripping. The band is placed around the outside of the baking pan (see FIGS. 5 and 6), stretched tightly, and securely fastened by overlapping the fastening strips as in FIGS. 3 and 7. The batter may be placed in the pan after the baking band is applied, but the pan should be greased or otherwise prepared first. The cake is thereafter baked as directed. Normal baking temperature and duration remain the same. After baking the cake, the baking band should be removed as soon as the pan is cool enough to handle, but before the pan has cooled completely.

The baking bands can be reused, but should be thoroughly cooled before being used again. They can be washed by hand or in a washing machine using any laundry soap or detergent and dried in a clothes dryer or hung to air dry.

In fabricating the bands, the terry cloth is cut to the desired size, folded lengthwise and stitched around the perimeter. Allowance should be made so that all edges can be turned under and held in place by the peripheral stitching so there are no rough edges or hanging threads. The hook- and loop- type fasteners are thereafter stitched in their proper locations.

While two embodiments of the present invention have been illustrated and described in detail, it is to be understood that this invention is not limited thereto and may be otherwise practiced within the scope of the following claims.

I claim:

1. A baking band, capable of absorbing and holding water throughout a baking period and adapted to completely surround and remain in contact with the entire outside wall of a baking pan, comprising a longitudinally folded terry cloth strip longer than the circumference of the baking pan, substantially the depth of the baking pan and having an attaching means at one end of said strip for union with an elongated longitudinally situated accepting means at the other end of said strip, wherein said attaching means is reversibly held at any point along said accepting means and wherein said baking band is usable with baking pans of variable circumferences and cakes baked using said baking band have a level top surface, minimal side shrinkage and an even texture.

2. In combination with a baking pan having an external wall surface and an interior containing a batter, means for preventing said batter from rising unevenly and shrinking at the edges comprising a baking band surrounding said baking pan and being in contact with the entire external wall surface thereof and longitudinal continuous securing means situated at one end of the band and accepting means situated at the other end of the band to reversibly secure the ends of the baking band in intimate contact at any desired point along their lengths, said baking band being non-elastic and capable of absorbing and holding sufficient water to remain moist throughout the baking period and said baking band and said securing means being usable with baking pans of variable circumferences.

3. A device, to enable the baking of a cake having a level top surface, minimal side shrinkage and an even consistency throughout, in attached relationship to a baking pan of the type having a continuous wall with an interior and an exterior surface enclosing and contiguous with a flat bottom, in the use of which a batter is placed therein, said device comprising a band of longitudinally folded terry cloth of a length greater than the circumference of the baking pan so as to completely surround said baking pan and of a width, after folding, substantially the height of the baking pan, and said band having an inner surface and an outer surface, a proximal end and a distal end, and further having a tab of hook-type fastener affixed to the inner surface at the proximal end and a strip of loop-type fastener affixed longitudinally to the outer surface at the distal end, said band and said strip of loop-type fastener being of a length so as to enable the band to to be usable with baking pans of diverse circumferences, and whereas when the band is saturated with water and placed around the exterior surface of the baking pan the tab of hook-type fastener engages the strip of loop-type fastener causing them to adhere to one another and causing the band of wet terry cloth to cling tightly about the entire exterior surface of the baking pan, the flexibility of said hook-type fastener and said loop-type fastener enabling the band to cling securely to baking pans with vertical sides and baking pans with slanted sides, and such that when the baking pan is placed in a heated oven the band remains in place, the water evaporates slowly maintaining slow heating of the wall of the baking pan, and the batter adjacent the interior wall of the baking pan is heated at the same rate as the batter in the center of the baking pan and the resulting cake has a level top surface, minimal side shrinkage and an even consistency, and the band can be used repeatedly without losing its integrity.

4. A device, to enable the baking of a cake having a level top surface, minimal side shrinkage and an even consistency throughout, in attached relationship to a baking pan of the type having a continuous wall with an interior and an exterior surface enclosing and contiguous with a flat bottom, in the use of which a batter is placed therein, said device comprising a band of longitudinally folded terry cloth of a length greater than the circumference of the baking pan so as to completely surround said baking pan and of a width, after folding, substantially the height of the baking pan, and said band having an inner surface and an outer surface, a proximal end and a distal end, an upper edge and a lower edge, and further having at least two tabs of hook-type fastener affixed to the inner surface at the proximal end, one near the upper edge and the other near the lower edge, and at least two strips of loop-type fastener affixed longitudinally to the outer surface at the distal end, one near the upper edge and the other near the lower edge, said band and said strips of loop-type fastener being of a length so as to enable the band to to be usable with baking pans of diverse circumferences, and whereas when the band is saturated with water and placed around the exterior surface of the baking pan the tabs of hook-type fastener engage the strips of loop-type fastener causing them to adhere to one another and causing the band of wet terry cloth to cling tightly about the exterior surface of the baking pan, the flexibility and placement of said hook-type fasteners and said loop-type fasteners enabling the band to cling securely to baking pans with vertical sides and baking pans with slanted sides, and such that when the baking pan is placed in a heated oven the band remains in place, the water evaporates slowly maintaining slow heating of the wall of the baking pan, and the batter adjacent the interior wall of the baking pan is heated at the same rate as the batter in the center of the baking pan and the resulting cake has a level top surface, minimal side shrinkage and an even consistency, and the band can be used repeatedly without losing its integrity.

5. A method of preparing a baking pan, of the type having a continuous wall with an interior and an exterior surface enclosing and contiguous with a flat bottom, in the use of which a batter is placed therein, to maintain a slow controlled heating of said wall to enable the baking of a cake having a level top surface, minimal side shrinkage and an even consistency throughout, said method comprising the steps of: greasing the baking pan as directed; fabricating a band of longitudinally folded terry cloth of a length greater than the circumference of the baking pan and of a width, after folding, substantially the height of the baking pan, and said band having an inner surface and an outer surface, a proximal end and a distal end, and further having at least one tab of hook-type fastener affixed to the inner surface at the proximal end and at least one strip of loop-type fastener affixed longitudinally to the outer surface at the distal end, said band and said strip of loop-type fastener being of a length so as to enable the band to to be usable with baking pans of diverse circumferences and the flexibility and placement of said hook-type fastener and said loop-type fastener enabling the band to cling securely to baking pans with vertical sides and to baking pans with slanted sides; saturating the band with water; placing the wet band about the exterior surface of the baking pan, pulling the band tightly and placing the tab of hook-type fastener in contact with the strip of loop-type fastener so that they engage one another thereby causing the band to cling to the entire exterior surface of the baking pan; and placing the batter in the baking pan; whereas when the baking pan with the batter is placed in a heated oven the water saturated band is effective in providing even heating along the entire wall of the baking pan at a rate comparable to the heating of the batter at the center of the baking pan and the resulting cake has a level top surface, minimal side shrinkage and an even consistency throughout.

* * * * *